United States Patent [19]

Tagansky

[11] 3,968,816
[45] July 13, 1976

[54] COCK

[76] Inventor: Elazar Tagansky, 16 Berdichevsky St., Tel Aviv, Israel

[22] Filed: Dec. 31, 1974

[21] Appl. No.: 537,826

[52] U.S. Cl. .......................... 137/606; 137/614.19; 137/625.4
[51] Int. Cl.² ...................................... F16K 19/00
[58] Field of Search ............... 137/625.4, 606, 607, 137/614.19; 251/63

[56] References Cited
UNITED STATES PATENTS

| | | | |
|---|---|---|---|
| 720,499 | 2/1903 | Spencer | 137/625.4 |
| 2,939,466 | 6/1960 | Hill | 251/63 X |
| 3,490,492 | 1/1970 | Fairchild | 137/625.4 |
| 3,693,611 | 9/1972 | Ploss | 137/625.4 X |

*Primary Examiner*—Robert G. Nilson
*Attorney, Agent, or Firm*—Browdy and Neimark

[57] ABSTRACT

A liquid dispensing apparatus contains a mixing chamber, a communication chamber and a shuttle valve movable within these chambers which can be used to mix hot and cold water. A conduit operated by a three-way valve and connected to either the hot or cold water source communicates with the communication chamber by an orifice directly opposite from the mixing chamber. The shuttle valve contains one face which is exposed to the liquid flowing from the mixing chamber and a second face, having a surface area larger than said first face, exposed to the liquid flowing through the conduit. Due to the larger surface area on the second face, the shuttle valve will move to close the mixing chamber when a liquid is flowing through the conduit.

3 Claims, 3 Drawing Figures

COCK

BACKGROUND OF INVENTION

The present invention relates to a valve and more particularly to a cock designed to dispense liquids, such cock being opened by pressure on a member remote from the cock itself, for instance, by pressure on a pedal, a press button or the like.

FIELD OF THE INVENTION

It is known to operate valves or cocks by means of pedals, the valve proper being actuated by a mechanism which is connected by mechanical means to the pedal by means of, for example, a connecting rod. In contradistinction to these known arrangements, the cock according to the present invention is actuated by the water pressure itself.

OBJECT OF THE INVENTION

It is the object of the invention to provide a cock of this kind which responds to pressure on a pedal or like member, which is fool-proof to a great extent, which is simple in construction and which may be applied to both ordinary dispensing valves or cocks as well as to mixing batteries.

SHORT STATEMENT OF THE INVENTION

According to this invention, the new cock comprises a valve chest or casing having two oppositely disposed inlet ports and an outlet port intermediate the two inlet ports. A floating cylindrical valve body is also provided, the two end faces of which are exposed to the water pressure. One of the faces offers a smaller area to the oncoming stream than the opposite one, and the axis of the cylindrical valve body is coincident with the axis of the two oppositely disposed inlet ports.

These and further features of the invention will become clear from the following description with reference to the annexed drawings.

SHORT DESCRIPTION OF DRAWINGS

FIG. 1 of the drawings is a horizontal section through the simplest form of a cock according to the invention.

DESCRIPTION OF PREFERRED EMBODIMENT

Figure 1:
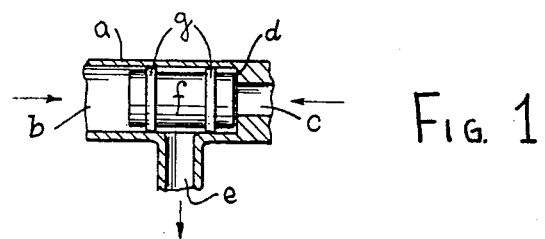

Turning first to FIG. 1, a valve chest $a$ has two inlets $b$ and $c$. As can be seen, a shoulder is formed within the chest behind the inlet $c$, such shoulder being indicated by the letter $d$. An outlet branching off at right angles to the two inlet ports $b$ and $c$ and indicated by the letter $e$ is positioned intermediate the two ports $b$ and $c$. In the valve chest and coaxial with it, and the two ports $b$ and $c$, is provided a piston like member $f$ which can slide freely within the valve chest, one cylindrical base of which abuts against the shoulder $d$. Packing rings $g$ are provided on the cylinder face of member $f$.

If water from the main is admitted into the valve chest $a$, through both inlet $b$ and inlet $c$, the full pressure of the main will act on the two end faces of the cylinder $f$, but since the area opposite the inlet $b$ and exposed to the oncoming stream is larger than the area at the opposite end of the cylinder and exposed to the oncoming stream through $c$, the pressure on the side of $b$ will prevail and urge the body $f$ towards the inlet $c$ and in this position sealing off the outlet $e$ which is now positioned between the two packing rings $g$. Assuming now that means are provided for deviating the stream entering through $b$ and permitting it to flow freely into the open (for which purpose means have to be provided of a known kind, as will be explained) the pressure on the face opposite the entrance $b$ will cease, with the result that the pressure acting on the face of the cylinder opposite $c$ will cause the latter to move to the left hand side of FIG. 1, thereby opening the outlet port $e$ so that the flow of water entering at $c$ will flow out through the outlet port $e$.

In order to direct the flow in the closing position into the inlet port $b$ and in the opening position into the open, an ordinary three way valve may be used which is operated by means of a pedal. It is obvious that this three way valve need not be positioned in the vicinity, or very near to the valve chest $a$, in fact it may be for instance on the floor and may be actuated directly by pressing down a pedal or for instance it may be on the wall or in the vicinity of a sink so that a person might actuate it by pressing a button with his elbow.

Figure 3:
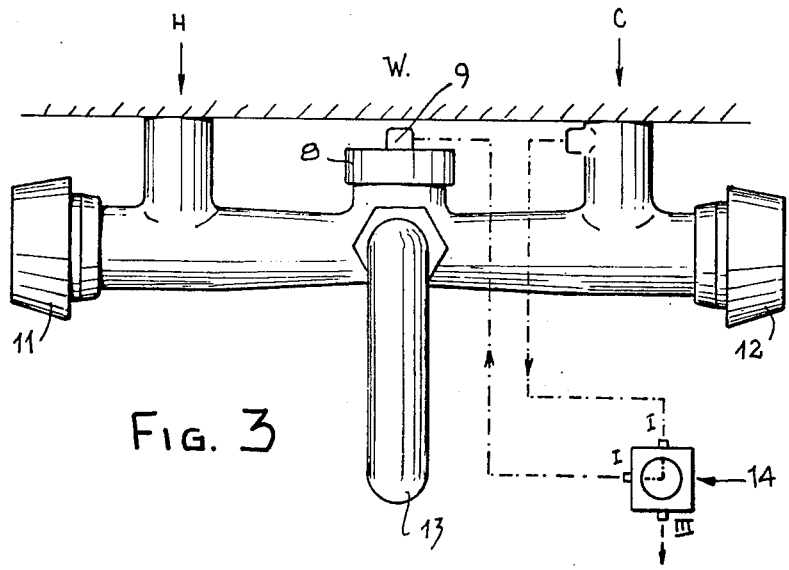
FIG. 3 is a mixing battery, shown in a top view and illustrating the flow of water in and out of the battery.
Figure 2:
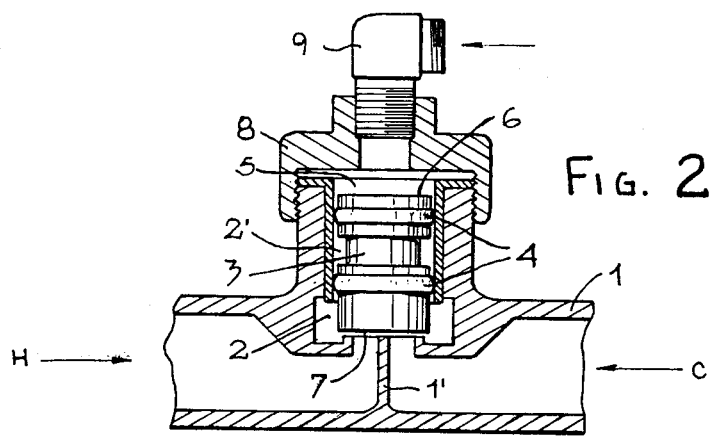
FIG. 2 illustrates the application of a valve according to the invention in combination with a mixing battery.

A practical embodiment is illustrated by FIGS. 2 and 3 in connection with a mixing battery. It is known that in mixing batteries the relative quantities of hot and cold water are adjusted by opening or closing the hot and the cold taps to a certain extent. If the taps are now closed for any period of time, such as to apply soap to the hands so as to save water, it will be necessary to readjust the taps until the proper mixing ratio is then found. In the arrangement according to the invention, the hot and cold taps can be opened while the outflow is permanently closed by a valve according to FIG. 1. If it is desired to have the mixture flow out, the respective pedal or button is pressed whereupon water flows and when pressure is released, water stops without disturbing the mixing ratio.

In the arrangement shown in FIG. 2 there is provided a mixing battery indicated by the numeral 1. Hot water can enter at the side indicated by the letter H while cold water can enter at the side indicated by the letter C. The hot and cold streams enter a mixing chamber 2 in two distinct streams partitioned from one another by a septum 1'. The outflow lies below or above the mixing chamber 2 and is not shown in the drawing of FIG. 2. In a chamber 2' and extending therefrom forwardly is provided cylindrical body 3, equivalent to body $f$ of FIG. 1, which again has two packing rings 4. The body can move axially in the chamber 2', there being provided an empty space 5 into which the body 3 can move if so urged. The cylinder face 6 is somewhat larger than the cylinder face 7 or rather the end face 6 is exposed fully to the oncoming stream while the end face 7 is exposed to the stream and the resulting pressure only partially. The chamber 2' is closed by a screwed cap 8 into which contains a conduit 9 connected to the main.

The operation of the new valve in connection with a mixing battery will become clear from a glance at the FIG. 3. If hot water enters the battery through the conduit indicated by H while cold water enters through the inlet indicated by the letter C, the end face 7 of body 3 is exposed to the pressure from the main. In both cases the flow can be closed off or admitted and can be regulated by ordinary turnable knobs 11 and 12 as are usually provided. The outflow from the mixing battery is constituted by a spout 13 which leads from the mixing chamber 2. In FIG. 3 the cap 8 and the inlet 9 leading from the main are shown. At any desired point, a three way valve 14 is provided which in position I directs a flow of water through the inlet 9 into the chamber 2', exposing face 6 to pressure of the main. In position III of the valve, the flow towards the face 7 is maintained but the flow which had been directed towards the face 6 of the cylinder is deviated into the open so that face 6 becomes pressureless with the result that the body 3 is urged into the space 5 thereby freeing the passage from both H and C to the outlet 13. As can be seen in FIG. 3 the necessary auxiliary flow which is to act on the cylindrical body 3 can be branched off from the conduit c into the valve 14 which directs the flow to both sides of the cylindrical body 3 or alternatively to one side only, as explained.

What is claimed is:

1. A fluid dispensing apparatus comprising, in combination:

a mixing chamber having a first inlet port and second inlet port, each port introducing a respective fluid stream into said mixing chamber through an opening having a perimeter which defines a valve seat, thereby allowing said fluid stream to mix;

first and second valve means in communication with respective ones of said inlet ports for opening and closing said first and second inlet ports respectively;

output means in fluid communication with said mixing chamber for dispensing said mixed fluid stream;

a communication chamber located adjacent said mixing chamber;

a conduit opening into said communication chamber directly opposite said mixing chamber and connected to one of said inlet ports;

third valve means connected between said conduit and that one of said ports connected to said conduit for controlling fluid flow through said conduit and into said communication chamber; and a shuttle valve, movable within said mixing chamber and said communication chamber, said shuttle valve having a first face providing, when seated on said seat, a given surface area exposed to the oncoming fluid flow from said inlet ports toward said mixing chamber and a second face having a surface area larger than said given surface area of said first face, exposed to the oncoming fluid flow from said conduit;

whereby when both faces of said shuttle valve are exposed to a fluid flow, said shuttle valve is forced toward said mixing chamber due to said larger surface area of said second face and closes said output means preventing fluid contained in said mixing chamber from flowing through said output means, and when only said first face is exposed to a fluid stream, said shuttle valve moves away from said mixing chamber, and said output means is opened allowing fluid contained in said mixing chamber to flow through said output means.

2. A fluid dispensing apparatus in accordance with claim 1 wherein said third valve means is a three-way valve.

3. A fluid dispensing apparatus in accordance with claim 1 wherein said fluid is a liquid.

* * * * *